US012228287B1

(12) United States Patent
Mcclearn et al.

(10) Patent No.: US 12,228,287 B1
(45) Date of Patent: *Feb. 18, 2025

(54) ROTATING DETONATION COMBUSTOR

(71) Applicant: Government of the United States, as represented by the Secretary of the Air Force, Wright-Patterson AFB, OH (US)

(72) Inventors: Michael Mcclearn, Dayton, OH (US); Riley Huff, Beavercreek, OH (US); John Hoke, Xenia, OH (US); Matthew Fotia, Kettering, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,495

(22) Filed: Nov. 18, 2019

Related U.S. Application Data

(60) Provisional application No. 62/781,674, filed on Dec. 19, 2018.

(51) Int. Cl.
*F23R 7/00* (2006.01)
*F02C 7/32* (2006.01)
*F23R 3/10* (2006.01)

(52) U.S. Cl.
CPC .......... *F23R 7/00* (2013.01); *F02C 7/32* (2013.01); *F23R 3/10* (2013.01); *F05D 2220/50* (2013.01)

(58) Field of Classification Search
CPC ...... F02C 7/32; F02C 9/26; F02C 5/02; F23R 7/00
See application file for complete search history.

(56) References Cited

U.S. PATENT DOCUMENTS

| | | | | |
|---|---|---|---|---|
| 1,654,119 A | * | 12/1927 | Enders | F02C 5/12 60/39.39 |
| 2,010,823 A | * | 8/1935 | Walter | F02C 5/12 60/774 |
| 2,640,314 A | | 12/1949 | Abel | |
| 2,924,937 A | * | 2/1960 | Leibach | F23R 3/38 60/804 |
| 3,336,754 A | * | 8/1967 | Lange | F02K 9/52 60/258 |

(Continued)

FOREIGN PATENT DOCUMENTS

WO WO-2016018172 A1 * 2/2016 ............ F02C 5/11

OTHER PUBLICATIONS

Lu et al "Rotating Detonation Wave Propulsion: Experimental Challenges, Modeling, and Engine Concepts" Journal of Propulsion and Power, vol. 30, No. 5, Sep.-Oct. 2014 (Year: 2014).*

(Continued)

*Primary Examiner* — Ted Kim
(74) *Attorney, Agent, or Firm* — AFMCLO/JAZ; Matthew D. Fair

(57) ABSTRACT

A rotating detonation combustor (RDC) and an associated system is disclosed herein. The RDC can be operably coupled with a vehicle to provide additional power capability over the primary motive power source. The RDC can be operated on demand to provide power to a turbine connected to an electrical power generator in some forms. The RDC can be used in stationary systems as well as moving vehicle systems.

9 Claims, 17 Drawing Sheets

(56) References Cited

U.S. PATENT DOCUMENTS

| | | | | |
|---|---|---|---|---|
| 3,748,054 A | * | 7/1973 | Eskeli | F01D 1/32 415/80 |
| 4,060,336 A | * | 11/1977 | Theis, Jr. | F01D 1/32 415/80 |
| 4,091,613 A | * | 5/1978 | Young | B64D 41/00 417/88 |
| 4,809,512 A | * | 3/1989 | Barbier | F23R 3/26 60/737 |
| 6,460,342 B1 | | 10/2002 | Nalim | |
| 9,599,065 B2 | | 3/2017 | Falempin | |
| 9,732,670 B2 | | 8/2017 | Joshi | |
| 2008/0136190 A1 | * | 6/2008 | Lee | F02C 3/05 290/52 |
| 2008/0141954 A1 | * | 6/2008 | Norris | F02C 7/18 123/41.21 |
| 2009/0241549 A1 | * | 10/2009 | Clay | F02C 3/165 60/767 |
| 2010/0050592 A1 | * | 3/2010 | Lu | F02K 7/08 60/39.38 |
| 2012/0171020 A1 | * | 7/2012 | Peck | F01D 17/165 415/150 |
| 2012/0324860 A1 | * | 12/2012 | Shimo | F23R 7/00 60/39.76 |
| 2015/0128599 A1 | | 5/2015 | Snyder | |
| 2015/0285506 A1 | | 10/2015 | Kasimov | |
| 2017/0146244 A1 | | 5/2017 | KurOsaka | |
| 2018/0080412 A1 | * | 3/2018 | Mizener | F02K 7/04 |
| 2018/0179950 A1 | * | 6/2018 | Peter | F02C 5/02 |
| 2018/0356099 A1 | * | 12/2018 | Zelina | F02C 5/02 |
| 2019/0086086 A1 | * | 3/2019 | Tangirala | F02C 3/16 |
| 2019/0271268 A1 | * | 9/2019 | Johnson | F02C 3/08 |
| 2020/0063968 A1 | * | 2/2020 | Gutmark | F23R 7/00 |

OTHER PUBLICATIONS

Huff et al "A Disk Rotating Detonation Engine Part 1: Design and Buildup" AIAA SciTech Forum, Jan. 8-12, 2018, Kissimmee, Florida, 2018 AIAA Aerospace Sciences Meeting, 10.2514/6.2018-0633, pp. 1-11 (Year: 2018).*

McClearn et al. "A Disk Rotating Detonation Engine Part 2: Operation" AIAA SciTech Forum, Jan. 8-12, 2018, Kissimmee, Florida, 2018 AIAA Aerospace Sciences Meeting, 10.2514/6.2018-1607, pp. 1-9 (Year: 2018).*

F A Bykovskii et al "Continuous spin detonation of a syngas-air mixture in a plane-radial vortex combustor" J. Phys.: Conf. Ser. 899 042001; pp. 1-4, Sep. 2017, (Year: 2017).*

F A Bykovskii et al "Detonation Burning of Anthracite and Lignite Particles in a Flow-Type Radial Combustor" ISSN 0010-5082, Combustion, Explosion, and Shock Waves, 2016, vol. 52, No. 6, pp. 703-712. c Pleiades Publishing, Ltd., 2016. (Year: 2016).*

F A Bykovskii et al "Continuous Spin Detonation of a Coal-Air Mixture in a Flow-Type Plane-Radial Combustor" Combustion, Explosion, and Shock Waves, vol. 49, No. 6, pp. 705-711, 2013 (Year: 2013).*

Nakagami et al "Experimental study of the structure of forward-tilting rotating detonation waves and highly maintained combustion chamber pressure in a disk-shaped combustor" Proceedings of the Combustion Institute 36 (2017) 2673-2680 (Year: 2017).*

Shank, Development and Testing of a Modular Rotating Detonation Engine (2012) 50th AIAA Aerospace Sciences Meeting including the New Horizons Forum and Aerospace Exposition Jan. 9-12, 2012, Nashville, Tennessee;12 pages.

Russo, Characterization of Pressure Rise Across a Continuous Detonation Engine, 47th AIAA/ASME/SAE/ASEE Joint Propulsion Conference & Exhibit Jul. 31-Aug. 3, 2011, San Diego, Californiapages ;13 pages.

Fotia, Experimental Study of the Performance of a Rotating Detonation Engine with Nozzle, Journal of Propulsion and Power vol. 32, No. 3, May-Jun. 2016, 11 pages.

Nakagami; Experimental Visualization of the Structure of Rotating Detonation Waves in a Disk-Shaped Combustor; Journal of Propulsion and Power vol. 33, No. 1, Jan.-Feb. 2017; 10 pages.

Higashi; Experimental Study of Disk-Shaped Rotating Detonation Turbine Engine; AIAA SciTech Forum 55th AIAA Aerospace Sciences Meeting Jan. 9-13, 2017, Grapevine, Texas; 12 Pages.

Schwer; Rotating Detonation-Wave Engines; Laboratory for Computational Physics and Fluid Dynamics; 2011 NLR Review; 6 pages.

Voytsekhovskiy,The Structure of a Detonation Front in Gasses, Russian Translation 1966, 184 pages 175.

Naples; Rotating Detonation Engine Implementation into an Open-Loop T63 Gas Turbine Engine; 55th AIAA Aerospace Sciences Meeting; Jan. 9-13, 2017, Grapevine, Texas; 10 pages.

Schauer; Detonation Initiation Studies and Performance Results for Pulsed Detonation Engine; 39th AIAA Aerospace Sciences Meeting & Exhibit Jan. 8-11, 2001 Reno, NV; 13 pages.

Welsh; RDE Integration with T63 Turboshaft Engine Components; Jan. 13-17, 2014, AIAA SciTech Forum National Harbor, Maryland; 11 pages.

Huff; A Disk Rotating Detonation Engine Part 1: Design and Buildup; American Institute of Aeronautics and Astronautics(date Jan. 2018); 11 pages.

Schauer; Interaction of a Pulsed Detonation Engine With a Turbine; 41st AIAA Aerospace Sciences Meeting & Exhibit Jan. 6-9, 2003 Reno, NV; 8 Pages.

McClearn; The Operation of a Disk Rotating Detonation Engine; American Institute of Aeronautics and Astronautics; (date Jan. 2018) 10 pages.

Shank; Development and Testing of a Modular RotatingDetonation Engine; 50th AIAA Aerospace Sciences Meeting Including the New Horizons Forum and Aerospace Exposition Jan. 9-12, 2012, Nashville, Tennessee; 12 Pages.

* cited by examiner

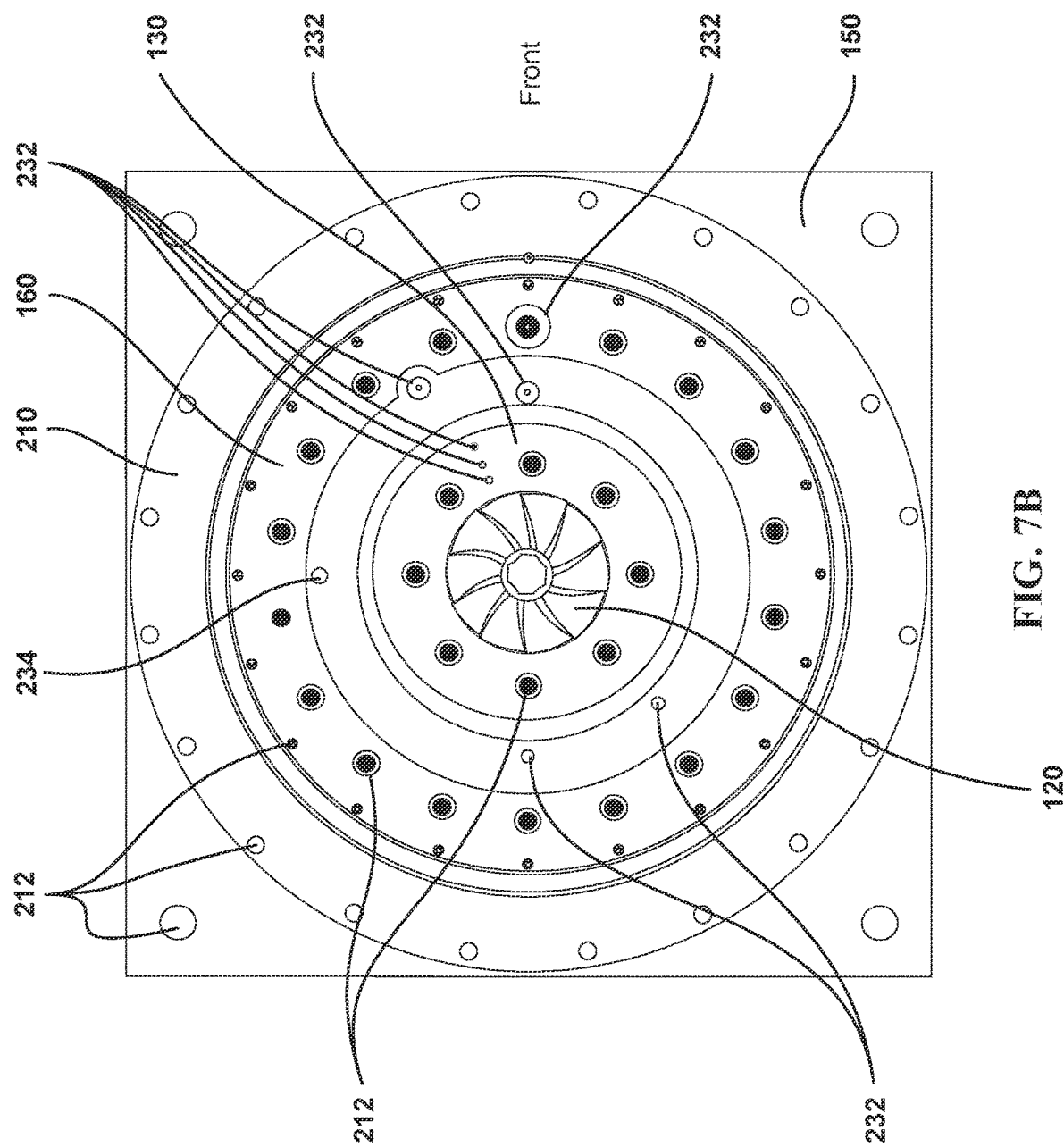

ROTATING DETONATION COMBUSTOR

Pursuant to 37 C.F.R. § 1.78 (a) (4), this application claims the benefit of and priority to prior filed Provisional Application Ser. No. 62/781,674, filed Dec. 19, 2018, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a rotating detonation combustor and more particularly, but not exclusively to a rotating detonation combustor for use in an auxiliary power system.

BACKGROUND

Some vehicle systems including aircraft, watercraft or automotive systems have peak power requirements that exceed the capacity of a primary power source such as an internal combustion engine or a gas turbine engine and the like. Power requirements for weapon systems in military applications can be particularly challenging. For example, some weapon systems require high bursts of energy that exceed the peak power capability of the primary motive power source. Such systems can include, but are not limited to directed energy weapons, electronic countermeasure systems, laser transmission, microwave transmission and the like. Some existing systems have various shortcomings, drawbacks, and disadvantages relative to certain applications. Accordingly, there remains a need for further contributions in this area of technology.

SUMMARY

One embodiment of the present disclosure includes a unique rotating detonation combustor configured to provide high temperature and pressure mass flow in a small compact space of a power system. Other embodiments include apparatuses, systems, devices, hardware, methods, and combinations wherein a rotating detonation combustor is configured to provide auxiliary power to supplement a primary power source. Further embodiments, forms, features, aspects, benefits, and advantages of the present application shall become apparent from the description and figures provided herewith.

BRIEF DESCRIPTION OF THE FIGURES

FIG. 7B is a front plan view of the rotating detonation combustor of FIG. 3B;

DETAILED DESCRIPTION OF THE ILLUSTRATIVE EMBODIMENTS

Figure 1:
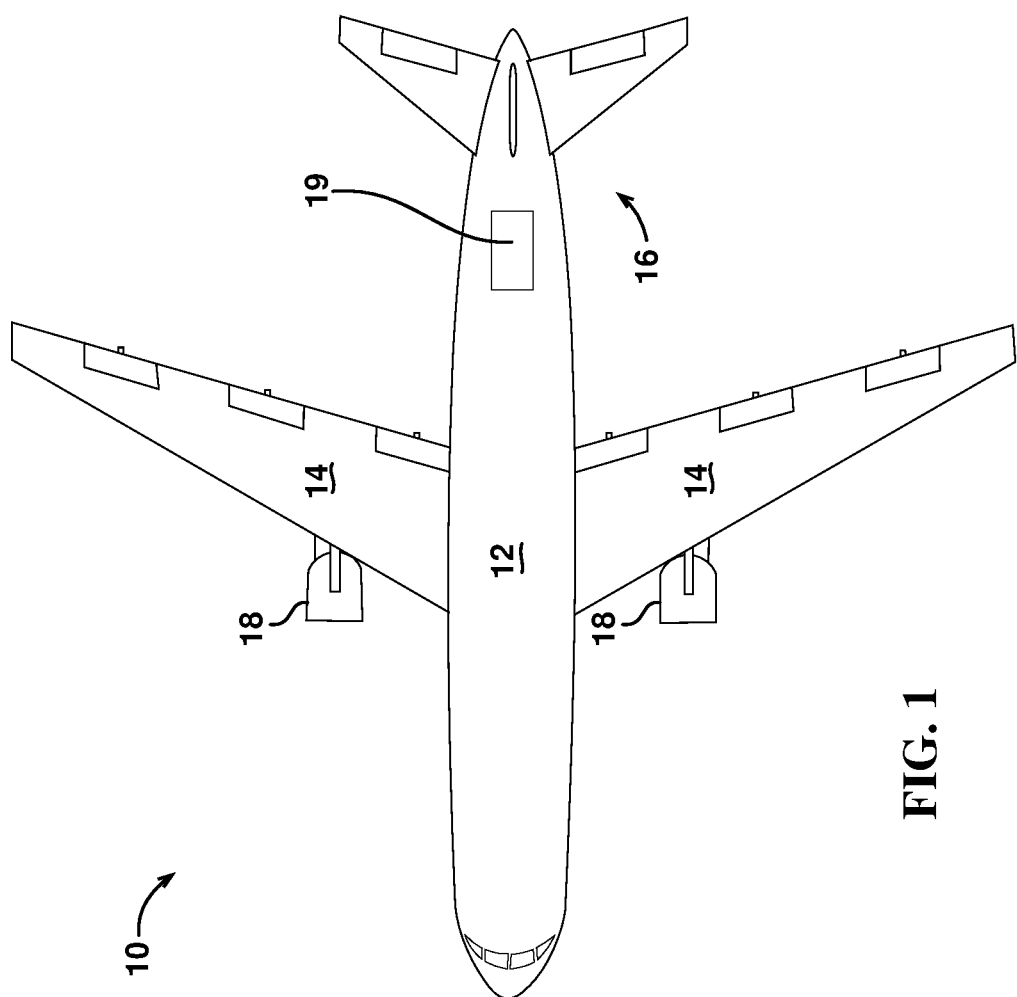
FIG. 1 is a schematic view of an exemplary aircraft with an auxiliary power system powered by a rotating detonation combustor according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, there are illustrated some aspects of a non-limiting example of a vehicle 10 that may be operable with a rotating detonation combustor (RDC) as will be described in detail below. In the illustrated embodiment, the vehicle 10 is in a form of an aircraft. However the RDC of the present invention is not limited to use in an aircraft, but on the contrary may be used with any type of engine powered vehicle or stationary system that can supply an oxidant and a fuel to the RDC at a predefined temperature, pressure and mass flow rate. Such vehicles can include, but are not limited to aircraft, spacecraft, land vehicles, marine vehicles, including and without limitation, surface vessels, submarines and/or semi-submersibles; amphibious vehicles, or any combination thereof. In various forms, the vehicle 10 may be manned, unmanned and/or autonomous in operation.

The exemplary aircraft 10 includes a fuselage 12, wings 14, an empennage 16 and a primary power system 18 in the form of a pair of gas turbine engines. The aircraft vehicle 10 may have only a single engine as a primary power source or a plurality of propulsion engines as a primary power source. An auxiliary power system 19 may be used in conjunction with the primary power source. The auxiliary power system 19 may be positioned in the empennage 16 as illustrated, however it should be understood that the location of the auxiliary power system 19 is not limited as such. The auxiliary power system 19 may be used to provide power to the vehicle 10 or other systems (not shown) when the primary power system 18 does not have spare energy capacity. In some forms the auxiliary power system 19 may be operationally coupled to the primary power system 18. For example, pressurized bleed air, electrical power and control signals may be diverted or transmitted between the primary and auxiliary power systems 18, 19 respectively. However in other forms the auxiliary power system 19 may be partially or wholly operationally separate from the primary power system 18.

Figure 2:
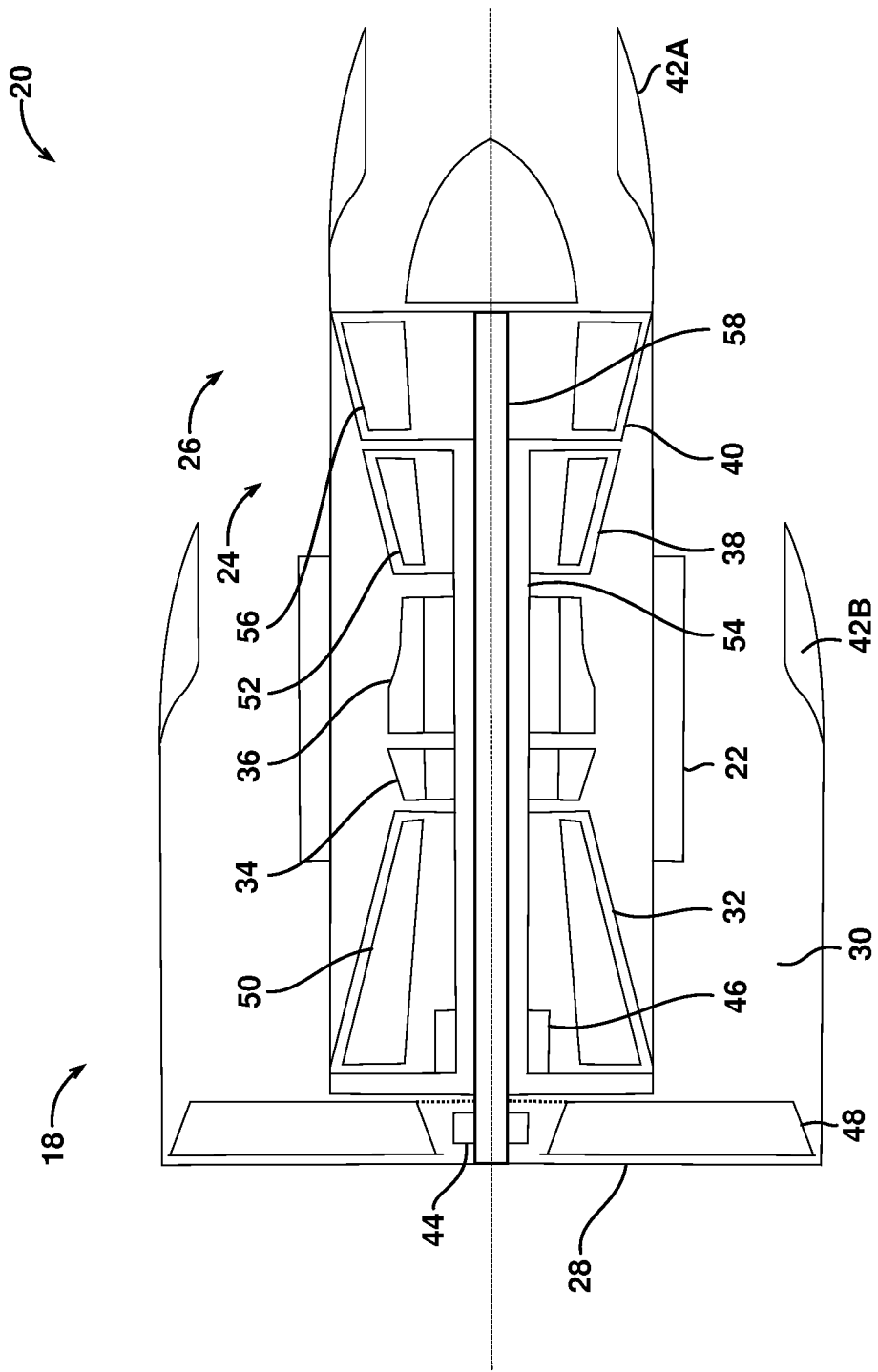
FIG. 2 is a schematic cross sectional view of a gas turbine engine that may be used as a primary power source for the aircraft of FIG. 1.
Figure 3A:
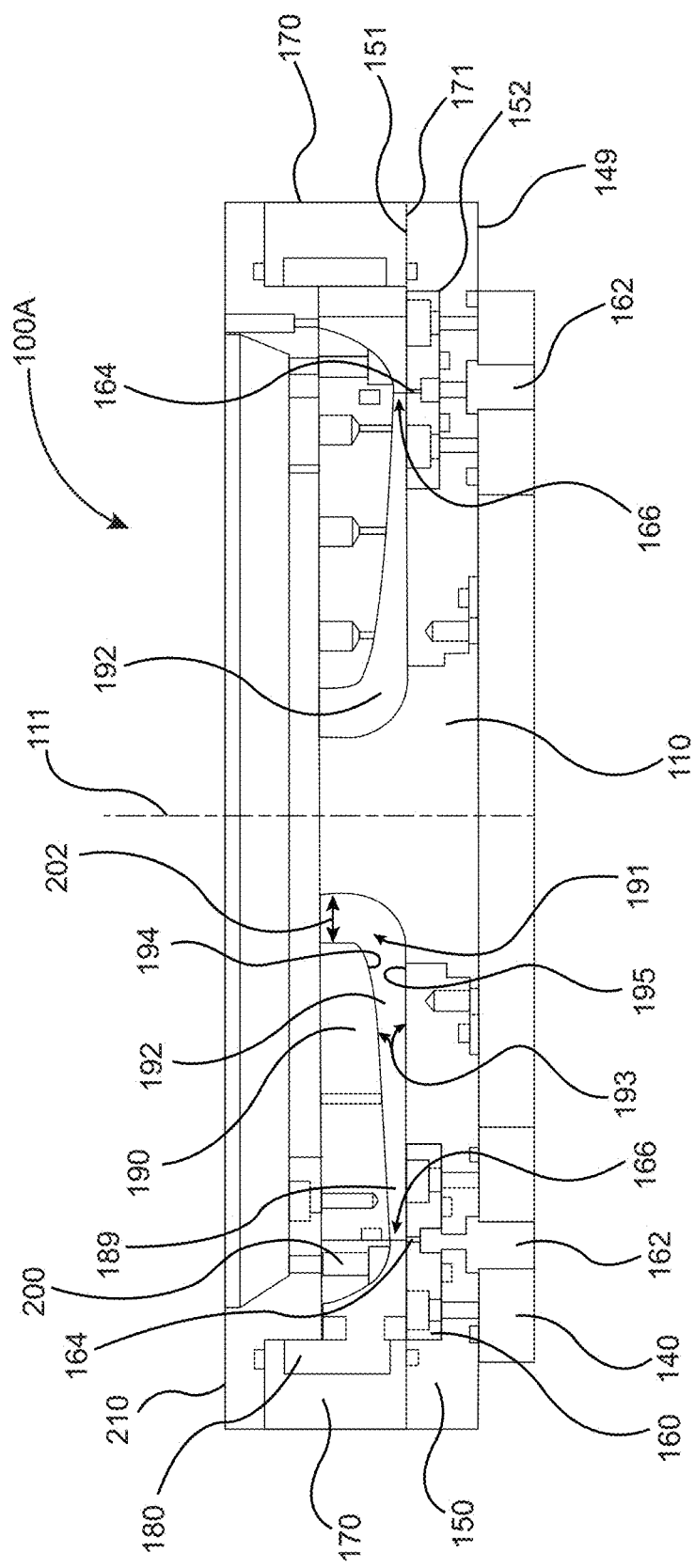
FIG. 3A is a cross sectional view of a rotating detonation combustor according to one embodiment of the present disclosure.
Figure 3B:
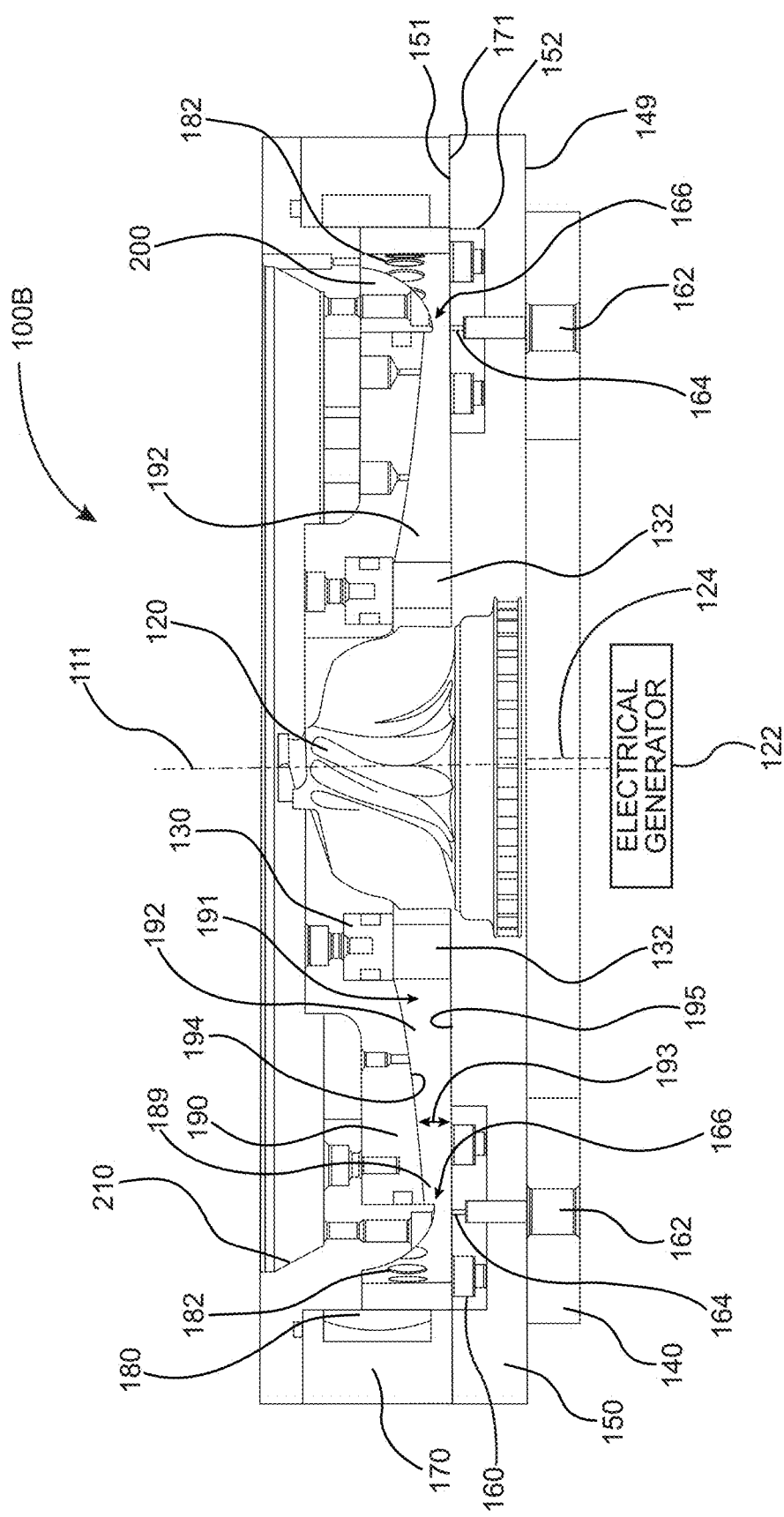
FIG. 3B is a cross sectional view of a rotating detonation combustor coupled to an electrical power generator according to one embodiment of the present disclosure.
Figure 4A:
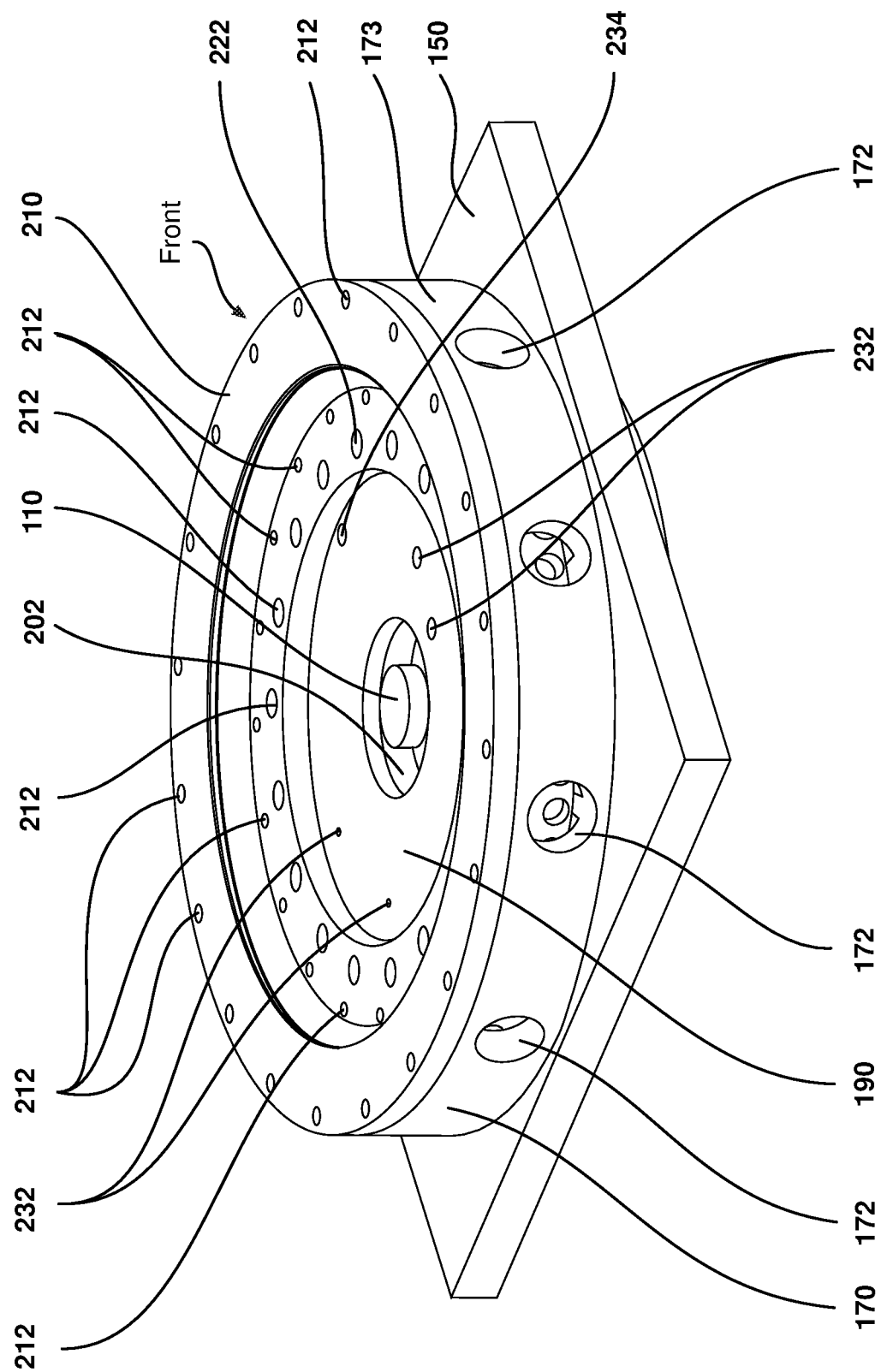
FIG. 4A is a top perspective view of the rotating detonation combustor of FIG. 3A.
Figure 4B:
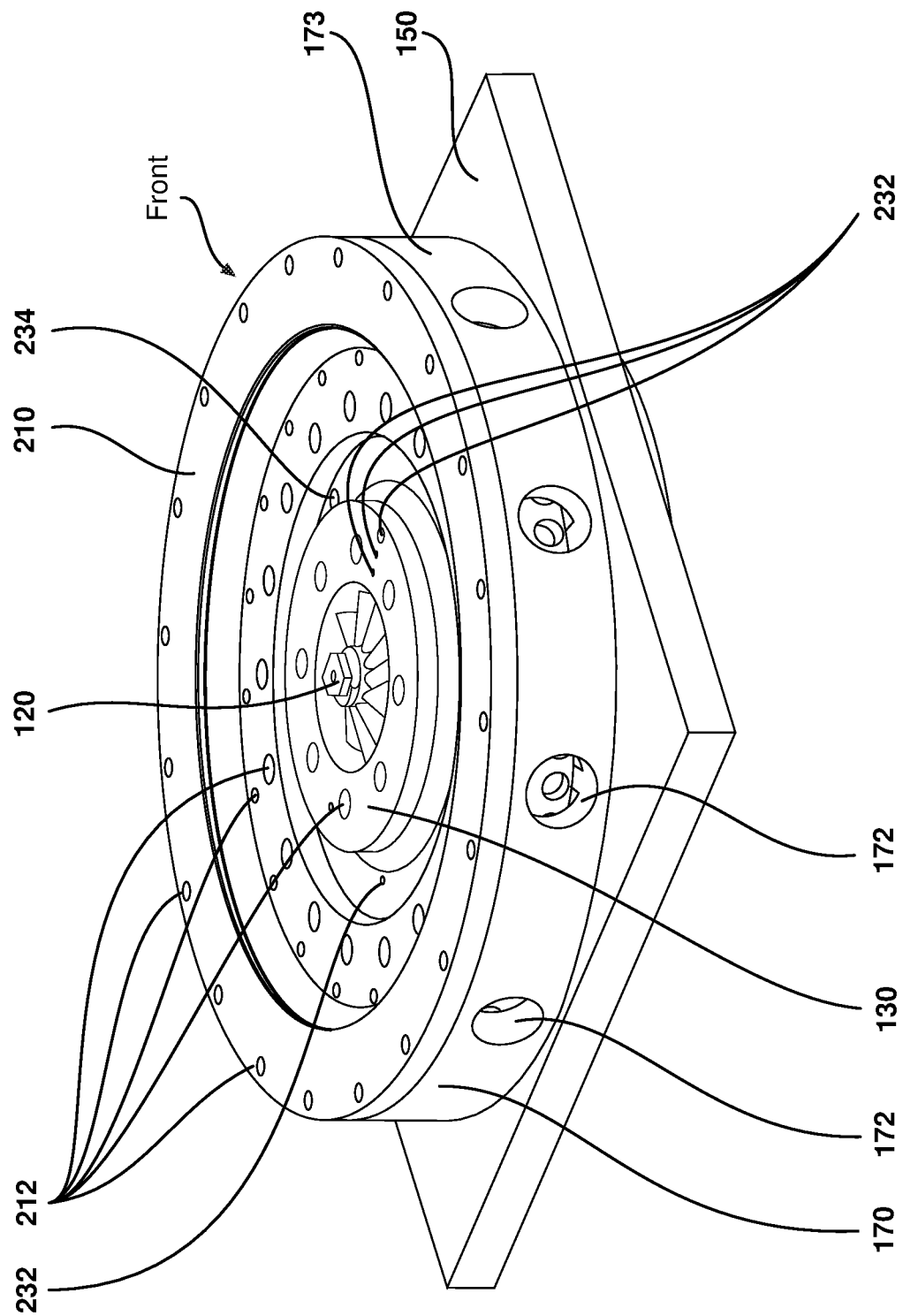
FIG. 4B is a top perspective view of the rotating detonation combustor of FIG. 3B.
Figure 5A:
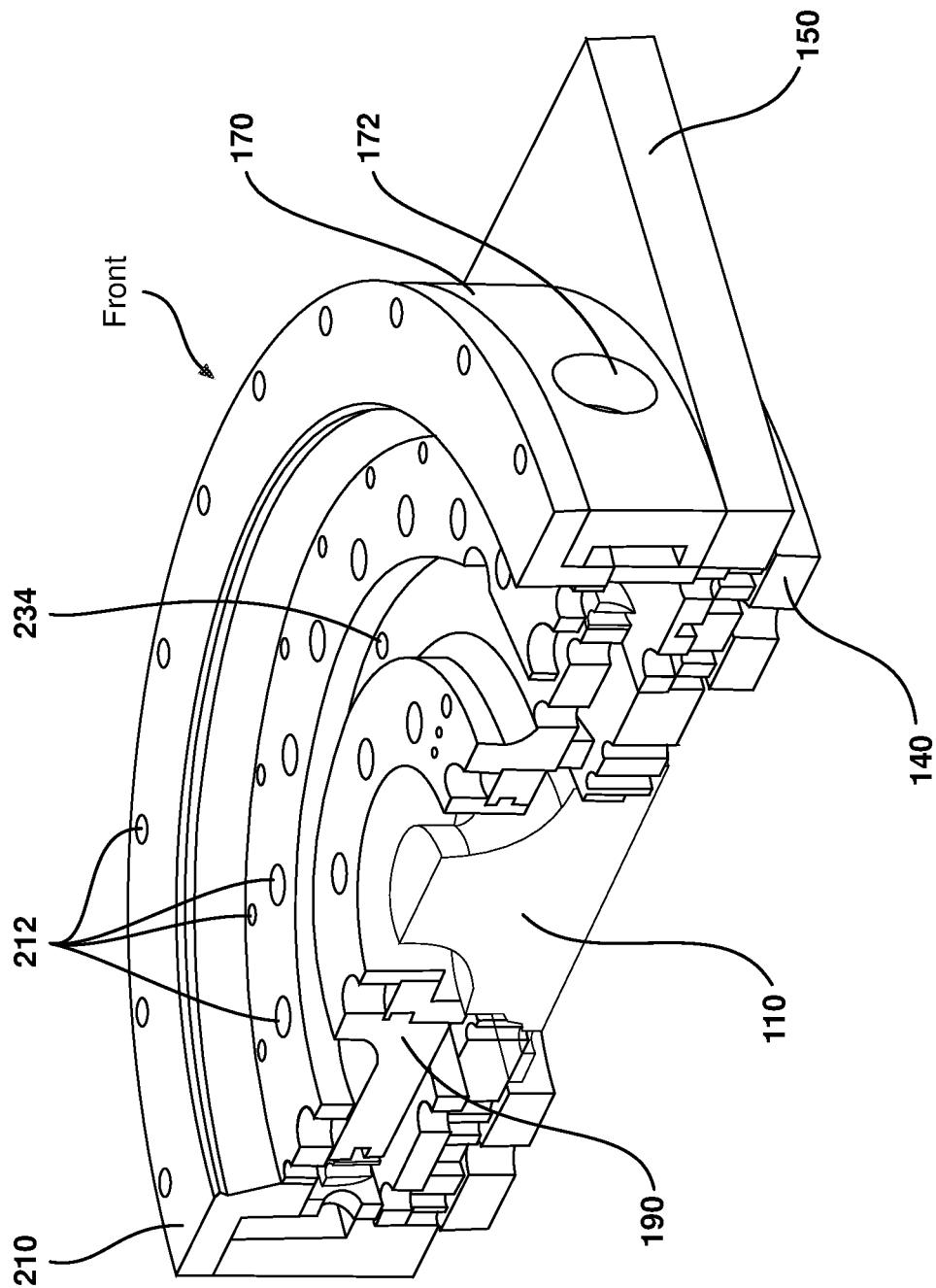
FIG. 5A is a top perspective cut-away view of the rotating detonation combustor of FIG. 3A.
Figure 5B:
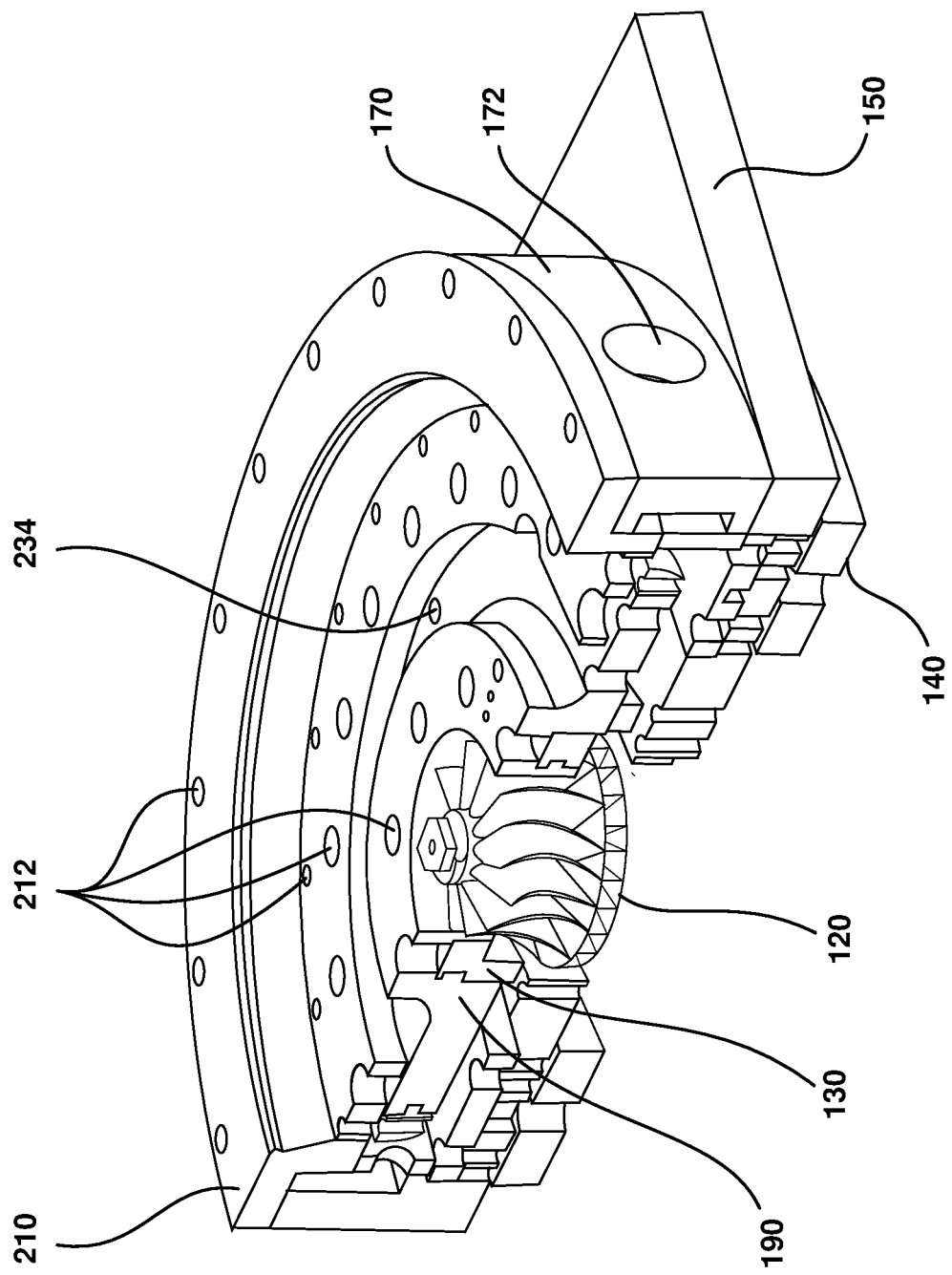
FIG. 5B is a top perspective cut-away view of the rotating detonation combustor of FIG. 3B.
Figure 6A:
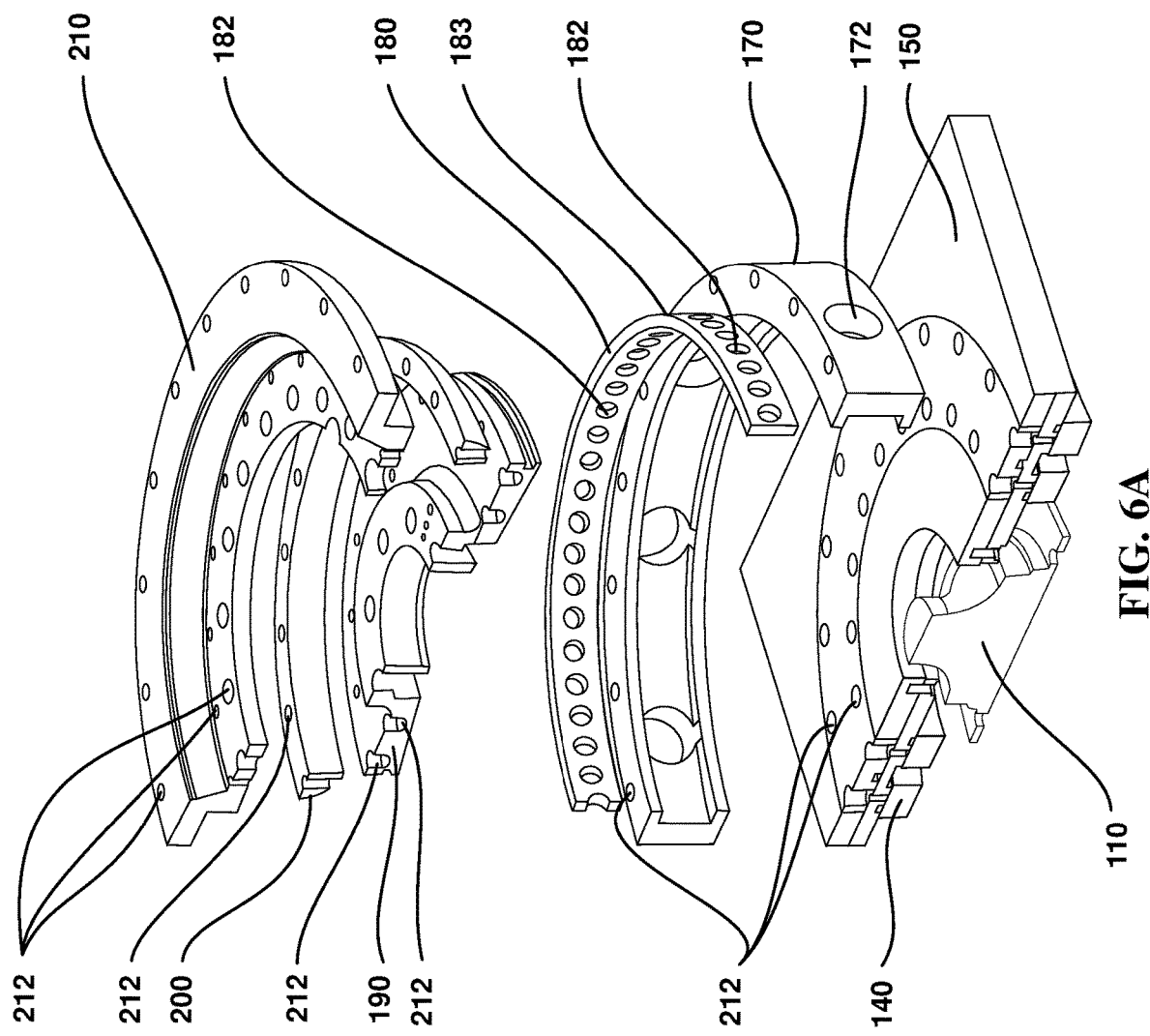
FIG. 6A is an exploded perspective view of the rotating detonation combustor of FIG. 5A.
Figure 6B:
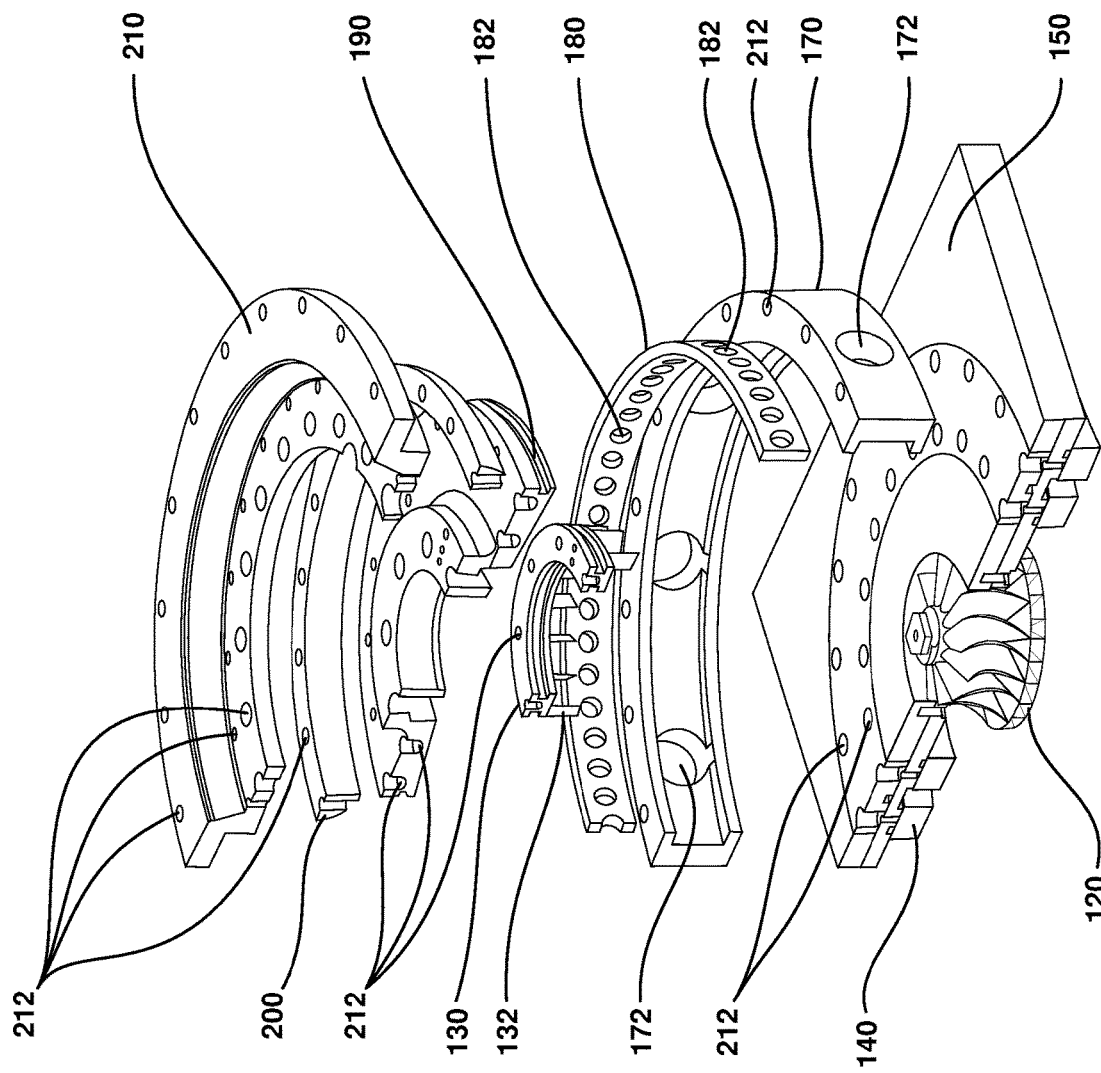
FIG. 6B is an exploded perspective view of the rotating detonation combustor of FIG. 5B.
Figure 7A:
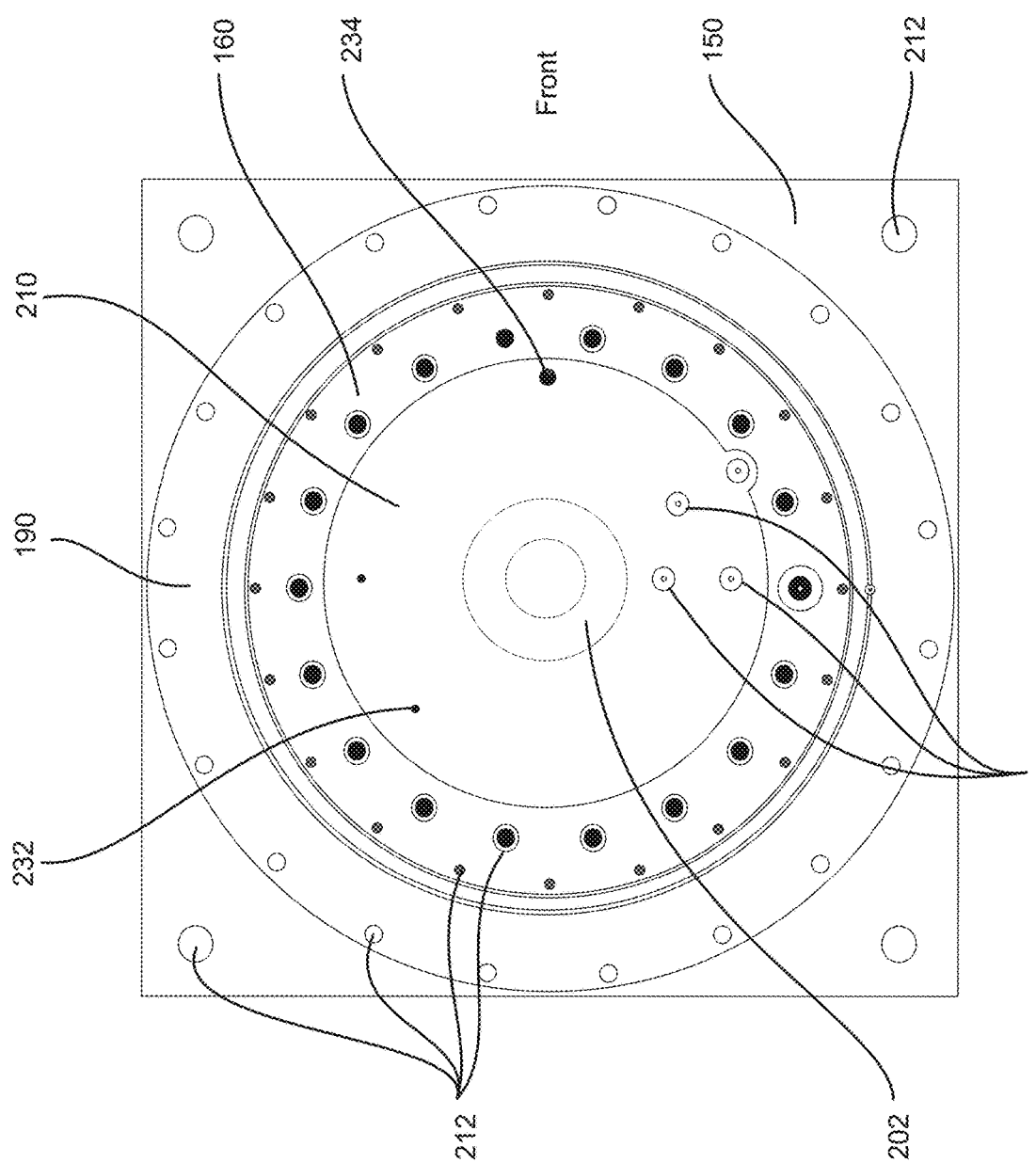
FIG. 7A is a front plan view of the rotating detonation combustor of FIG. 3A.
Figure 8A:
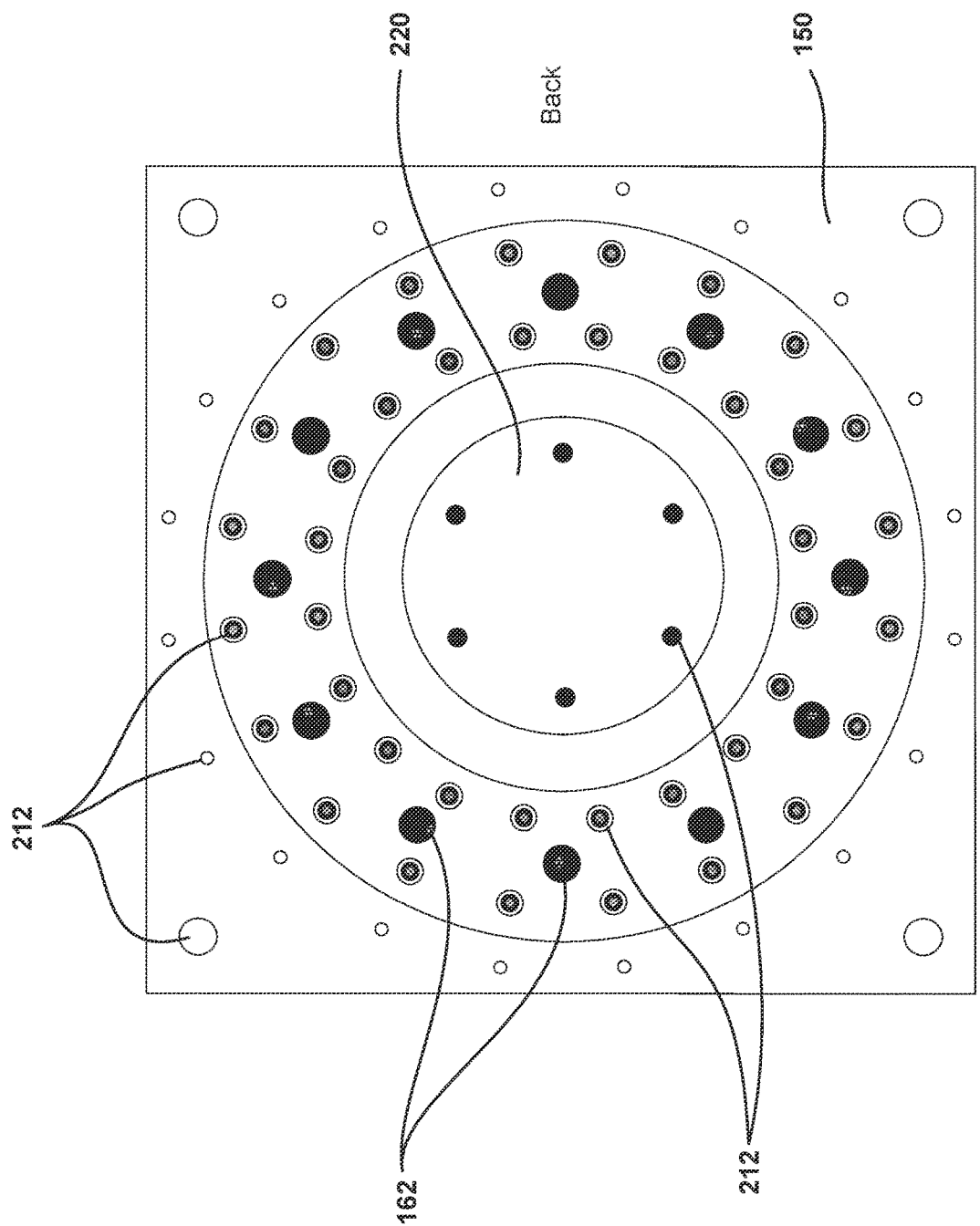
FIG. 8A is a back plan view of the rotating detonation combustor of FIG. 3A.
Figure 8B:
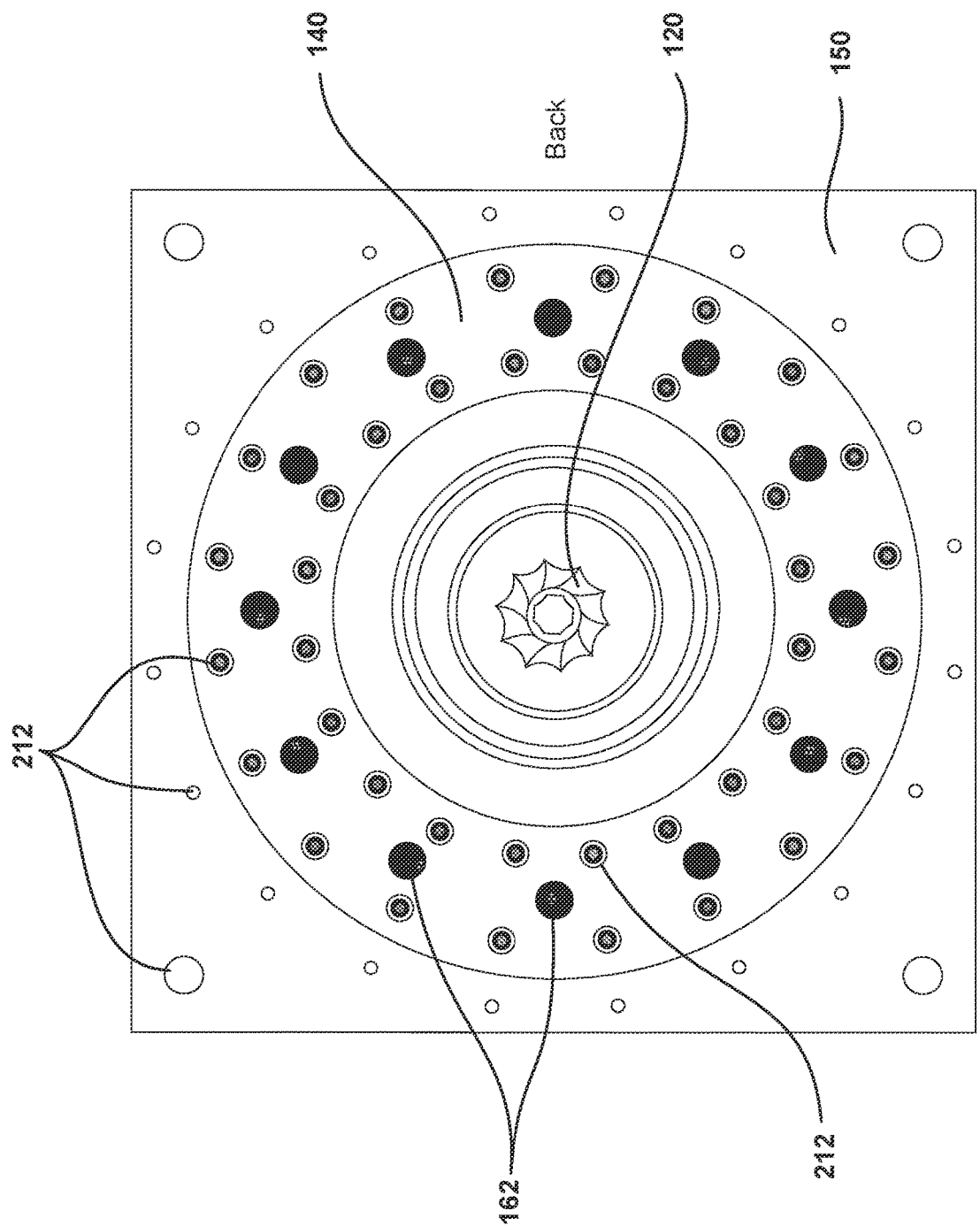
FIG. 8B is a back plan view of the rotating detonation combustor of FIG. 3B.

Referring to FIG. 2, there are illustrated some aspects of a non-limiting example of a primary power propulsion system 18 in accordance with an embodiment of the present invention. The propulsion system 18 can include a gas turbine engine 20 that functions as a main power source, i.e., main propulsion engine. The propulsion system 18 can also include an auxiliary power unit 22 that is operably connected to the auxiliary power system 19 disposed on the vehicle 10 apart from the gas turbine engine 20. As is conventional with aircraft operation, propulsive thrust is provided by propulsion system 18 for the aircraft 10. The primary power source can include a propulsive force that may be generated by one of a number of different means, for example and without limitation, one or more turbofans, propellers, turbines, prop fans and/or other rotor systems that generate thrust. Alternatively the power output from the primary power source may also be converted to other mechanical means to provide motive power to land-based vehicles or water vessels as would be understood by one skilled in the art.

In the exemplary form, the gas turbine engine 20 includes a high pressure (HP) spool 24 and a low pressure (LP) spool 26. In other embodiments, the engine 20 may include three or more spools, e.g., may include an intermediate pressure (IP) spool and/or other spools. In the illustrated form, the engine 20 is a turbofan engine, wherein LP spool 26 is operable to drive a turbofan 28. In other embodiments, the engine 20 may be a turboprop engine, wherein the LP spool 26 powers a propeller system (not shown), e.g., via a reduction gearbox (not shown). In still other embodiments, the propulsion 28 may be a helicopter rotor or tilt-wing aircraft rotor.

The gas turbine engine 20 can include a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. Pressurized bleed air may be ducted from any location upstream of the combustion system 36. The gas turbine engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. In other embodiments, the gas turbine engine 20 may also include an electrical machine 44 coupled to LP spool 26, and an electrical machine 46 coupled to HP spool 24. The electrical machines 44 and 46 are configured to convert mechanical power to electrical power, and to convert electrical power to mechanical power, e.g., an electric motor/electric generator. In other embodiments, one or both of electrical machines 44 and 46 may be configured to only convert mechanical power into electrical power, e.g., an electrical generator. In still other embodiments, one or both of electrical machines 44 and 46 may be configured to only convert electrical power into mechanical power, e.g., an electric motor. In one form, both electrical machine 44 and electrical machine 46 are configured to provide power to aircraft 10 during operation. In some forms, the electrical machines 44 and 46 may be mechanically and electrically coupled to the auxiliary power system 19.

The fan system 28 includes a fan rotor system 48 driven by LP spool 26. In various embodiments, fan rotor system 48 includes one or more rotors (not shown) that are powered by turbine system 40. The fan system 28 may include one or more vanes (not shown). The bypass duct 30 is operable to transmit a bypass flow generated by fan system 28 around the core of engine 20. The compressor system 32 includes a compressor rotor system 50. In various embodiments, compressor rotor system 50 includes one or more rotors (not shown) that are powered by turbine system 38. The turbine system 38 includes a turbine rotor system 52. In various embodiments, turbine rotor system 52 includes one or more rotors (not shown) operable to drive compressor rotor system 50. The turbine rotor system 52 is drivingly coupled to compressor rotor system 50 via a shafting system 54. The turbine system 40 includes a turbine rotor system 56. In various embodiments, turbine rotor system 56 includes one or more rotors (not shown) operable to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. The turbine system 40 is operable to discharge the engine 20 core flow to the nozzle 42A.

Referring generally to FIGS. 3-10, various views of a rotating detonation combustor (RDC) are illustrated. The RDC can function as a power source for the auxiliary power system 19 as depicted in FIG. 1 in some embodiments. However it should be understood that the RDC can be used in other systems and forms as would occur to one skilled in the art. FIGS. 3A-10A depicts views of an RDC 100A in an embodiment having a variable nozzle insert 110 downstream of the combustion chamber. FIGS. 3B-10B depict views of an RDC 100B in another embodiment wherein a turbine 120 is operably coupled downstream of the combustor to an electrical generator 122 via a shaft 124. RDC 100B also includes an inlet guide vane ring 130 having a plurality of guide vanes 132 positioned upstream of the turbine 120. The majority of the components of the RDC 100A, 100B in both embodiments are similar or exactly the same and therefore will be generally described together. The RDCs 100A, 100B include a centerline 111 that also defines the axis of rotation of the turbine 120 for RDC 100B. The centerline/axis of rotation 111 is the most radially inward position of the RDCs 100A, 100B.

The RDC 100A, 100B includes a fuel supply ring 140 coupled to a back wall 149 of a base plate 150. An air inlet spacer ring 170 is coupled to a front wall 151 of the base plate 150. A fuel ring 160 is positioned within a circular pocket 152 formed in the front wall 151 of the base plate 150 adjacent to and radially inward of the air inlet spacer ring 170. A front wall 159 of the fuel ring 160 is substantially flush with both the front wall 151 of the base plate 150 and with a back wall 171 of the air inlet spacer ring 170. A plurality of fuel supply ports 162 are formed in the fuel supply ring 140. Each of the fuel supply ports 162 includes a fuel injection nozzle 164 configured to increase the injection velocity of the fuel into an injection area 166.

An air distribution ring 180 mounts radially inward of and adjacent to the air inlet spacer ring 170. The air inlet spacer ring 170 includes a plurality of air inlet ports 172 formed though the peripheral wall 173 thereof. The air inlet ports 172 are configured to receive air from an external source. Typically the air is compressed through a separate compression process such as by the primary power source or standalone compressor. In some forms the air may be supplied directly from ambient sources. The air distribution ring 180 includes a plurality of air distribution apertures 182 formed through a peripheral wall 183 thereof. The plurality of air distribution apertures 182 are in fluid communication with the air inlet ports 172 of the air inlet spacer ring 170.

A channel plate 190 is positioned radially inward of and adjacent to the air distribution ring 180. The channel plate 190 extends laterally across a portion of the fuel ring 160 and the base plate 150 in spaced apart manner so as to form a detonation combustion chamber 192 therebetween. A width 193 of the detonation combustion chamber 192 is defined between an inner wall 194 of the detonation combustion chamber 192 and an outer wall 195 of a portion of the base plate 150. An annulus area of the detonation combustion chamber 192 is defined by the width 193 at a single radial location as defined between the outer peripheral wall 173 of the air inlet spacer ring 170 and projecting around the centerline/axis of rotation 111 of the RDC 100A, 100B respectively. In one form, the annulus area of the detonation combustion chamber 192 is substantially constant along the flow path in the radial direction from an inlet 189 of the detonation combustion chamber 192 to the outlet 191 of the detonation combustion chamber 192. Both the inner wall 194 of the channel plate 190 and the outer wall of the base plate 150 may have portions that are substantially straight or flat while other portions may have an arcuate or curved shape.

A throat ring 200 is positioned upstream of the inlet 189 of the detonation combustion chamber 192 between the air distribution ring 180 and the channel plate 190. The throat ring 200 is shaped to define a desired injection area 166 at the inlet 189 of the detonation combustion chamber 192. One of any of a plurality of differently sized throat rings 200 can be used so as to define a variably sized injection area 166 to optimize combustion efficiency for different applications. A top plate 210 is positioned over the throat ring 200 and is connected through each of the intermediate components to the baseplate 150. A plurality of bolts (not shown) are positioned through a plurality of bolt boles 212 to releasably lock the assembly together. A back plate 220 is coupled to the baseplate 150 to cover the back of the nozzle 110 of RDC 100A. A plurality of sensor measurement locations 232 are provided so that pressure and temperature measurements may be taken as desired. A pre-detonator (not shown) can be coupled to the RDCs at the pre-detonator port location 234.

Figure 9:
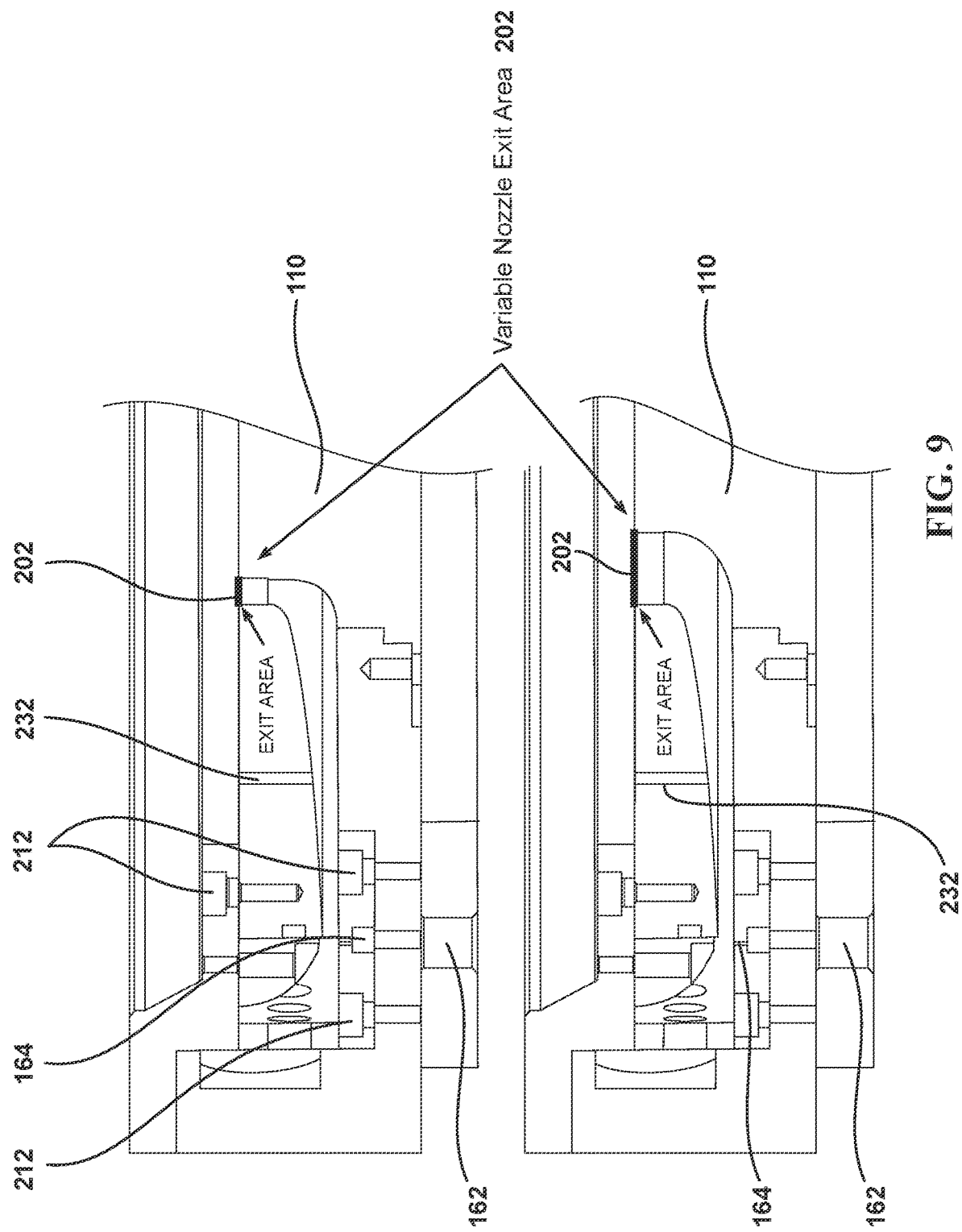
FIG. 9 is a cross sectional view of a portion of the rotating detonation combustor of FIG. 3A illustrating variably sizable nozzle exit areas.

A nozzle discharge exit area 202 of the detonation combustion chamber 192 is defined between the nozzle insert 110 for the RDC 100A. The nozzle discharge exit area 202 can be varied by using differently sized nozzle inserts as is shown in FIG. 9. The nozzle discharge exit area 202 provides a desired back pressure on the detonation combustion chamber 192 and can be sized to maximize efficiency for the RDC 100A. The vane ring 130 controls flow velocity and back pressure exiting the detonation combustion chamber 192 prior to entering the turbine 120 for the RDC 100B. In some forms the inlet guide vanes 132 can be variable to change the velocity and back pressure for different operating conditions of the RDC 100B. The inlet guide vanes 132 can be moved via actuation means as one skilled in the art would readily understand.

Figure 10A:
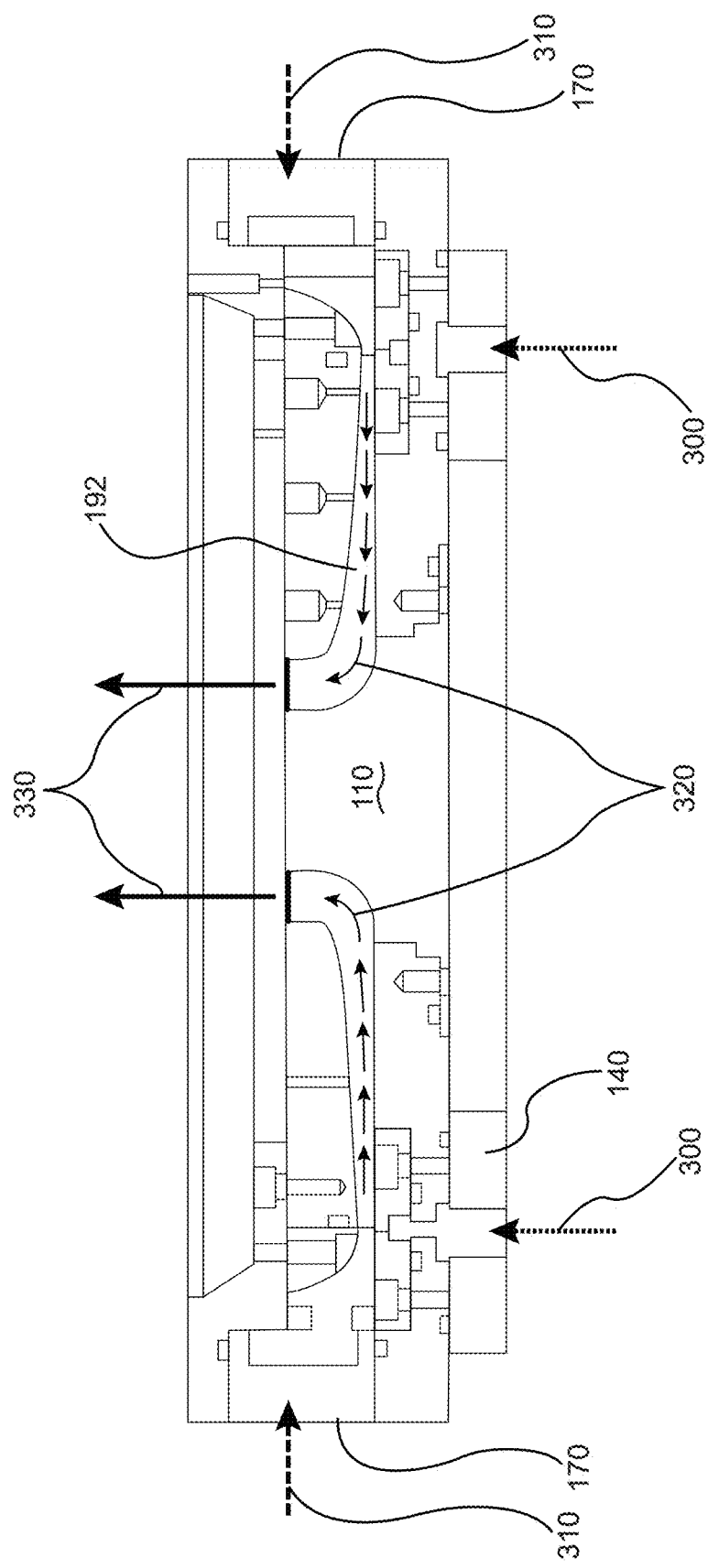
FIG. 10A is a cross sectional view of FIG. 3A with a schematic illustration of fuel, air and combustion exhaust flow paths therethrough.
Figure 10B:
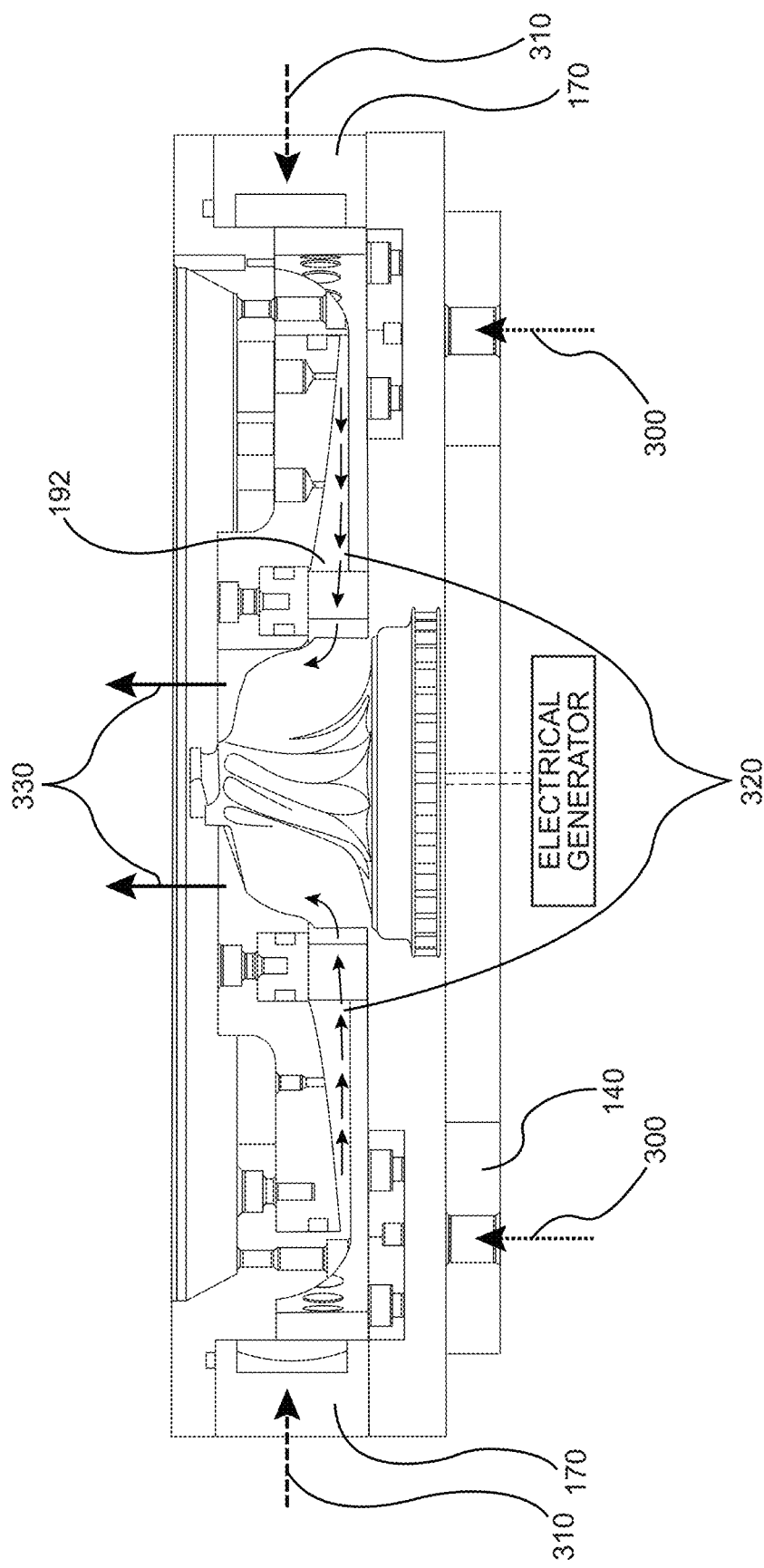
FIG. 10B is a cross sectional view of FIG. 3B with a schematic illustration of fuel, air and combustion exhaust flow paths therethrough.

Referring more particularly to FIGS. 10A and 10B, the general operation of the RDCs 100A, 100B are illustrated therein. Fuel flow represented by arrows 300 enter the RDCs 100A, 100B through the fuel supply ring 140 at one or more locations. Airflow represented by arrows 310 enter the RDCs 100A, 100B through air inlet spacer ring 170 at one or more locations. The fuel 300 and air 310 mix at the inlet of the detonation combustion chamber 192. A pre-detonator igniter (not shown) initially "lights off" the combustion in the detonation combustion chamber 192 after which a continuous detonation wave rotates about the detonation combustion chamber 192 to cause a continuous rotational combustion source. The combustion flow process moves in a radially inward direction illustrated by arrows 320. The exhaust flow 330 exits past the nozzle insert 110 or the turbine 120 in their respective RDCs 100A, 100B. The turbine 120 can be operably connected to an electrical generator as shown in FIG. B.

In one aspect the present disclosure includes a rotating detonation combustor (RDC) comprising: a base plate defined by an outer perimeter wall and a central aperture formed therethrough; a top plate connected to the base plate; a channel plate positioned between the base plate and the top plate, the channel plate having a central aperture formed therethrough and an arcuate sidewall that diverges away from the base plate from the outer perimeter to the central aperture; a combustion chamber formed between the arcuate sidewall of the channel plate and the base plate; a combustor inlet port defined proximate the outer perimeter of the base plate and a combustor outlet port defined radially inward of the inlet port proximate the central aperture; and wherein a cross sectional area of the combustion chamber is substantially constant from the inlet port to the outlet port.

In further aspects, the present disclosure includes a throat ring positioned proximate the combustor inlet port, the throat ring sized to control a variable area at a location of a fuel injection port; a nozzle insert positioned downstream of the combustor, the nozzle insert selected from a group of differently sized nozzle inserts; a variable nozzle area defined by a size of a selected nozzle insert a nozzle guide vane ring positioned downstream of the combustor; wherein the nozzle guide vane ring includes a plurality of movable guide vanes; a turbine positioned downstream of the nozzle guide vane ring; wherein the turbine generates 100% power within 0.1 seconds of combustor ignition, wherein a fuel is stored in one of a gaseous form or a liquid form prior to combustion; a fuel ring having a plurality of fuel injection nozzles formed therein; and wherein the fuel ring is selected as one of a plurality of different fuel rings defined by variation in size and number of fuel injection nozzles.

In another aspect the present disclosure includes a rotating detonation combustor (RDC) comprising: a base plate defined by an outer perimeter wall and a central aperture formed therethrough; a top plate connected to the base plate; a fuel ring selected from one of a plurality of different fuel rings positioned between the top plate and the base plate; an air distribution ring positioned between the fuel ring and the top plate; a channel plate positioned between the base plate and the top plate; and a throat ring positioned between the top plate and the channel plate, and the throat ring selected from a plurality of differently sized throat rings to define a variable fuel injection area.

In refining aspects the present disclosure includes an RDC wherein each of the plurality of fuel rings include fuel injection nozzles that vary in size and number relative to other of the plurality of fuel rings; a combustion chamber formed between the channel plate and the base plate, the combustion chamber extending radially inward from a combustor inlet port defined proximate the outer perimeter of the base plate and a combustor outlet port proximate the central aperture; wherein a cross sectional area of the combustion chamber is substantially constant from the inlet port to the outlet port; wherein the channel plate includes a central aperture formed therethrough and an arcuate sidewall that diverges away from the base plate from the outer perimeter to the central aperture; an exhaust nozzle positioned downstream of the combustion chamber; wherein the exhaust nozzle is selected from one of a plurality of different exhaust nozzles with different sizes to control and define a variable exhaust nozzle flow area; a turbine positioned downstream of the combustion chamber; a plurality of nozzle guide vanes positioned upstream of the turbine; wherein the nozzle guide vanes are movable to control a velocity of the exhaust flow entering into the turbine; wherein a combustible fuel is stored in one of a gaseous or a liquid form; a pressurized air source operably connected to the air distribution ring; and wherein the pressurized air source is a primary motive power source positioned in a vehicle.

In another aspect, the present disclosure includes a method comprising: generating pressurized air; transporting the pressurized air to a rotating detonation combustor (RDC); combusting a fuel and pressurized air in a constant area radial combustion chamber of the RDC; and exhausting combustion exhaust flow from the combustion chamber.

In refining aspects of the method, the constant area radial combustion chamber includes an arcuate sidewall; generating primary motive power and the pressurized air from one of a gas turbine engine, an internal combustion engine and an electric motor; producing auxiliary power with the exhaust flow with the combustion exhaust flow from the RDC; and generating maximum auxiliary power with the RDC within 0.1 seconds of fuel ignition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A rotating detonation combustor (RDC) assembly, comprising:
    a fuel supply ring having a first face defining a first side of the RDC and a second face spaced apart from the first face;
    a plurality of first fuel supply passageways formed through the fuel supply ring;
    a baseplate connected to the second face of the fuel supply ring;
    a central aperture formed through the baseplate;
    a nozzle insert positioned in the central aperture of the baseplate;
    a circular pocket formed in the baseplate around the central aperture;
    a plurality of second fuel passageways formed through the baseplate fluidly connected to the circular pocket;
    a fuel ring positioned in the circular pocket of the baseplate;
    a plurality of third fuel passageways formed through the fuel ring;
    an air inlet spacer ring connected to the baseplate on the opposite side from the fuel supply ring, the air inlet spacer ring positioned around an outer perimeter of the RDC, the air inlet spacer ring having a plurality of air inlet ports positioned circumferentially around a radial combustion chamber projecting radially inward from the outer perimeter;
    an air distribution ring positioned radially inward of the air inlet spacer ring, the air distribution ring having a plurality of air distribution apertures that are greater in number and smaller in size to that of the plurality of air inlet ports,
    a channel plate positioned radially inward of the air distribution ring, the channel plate having an arcuate aft face and a flat front face;
    wherein the radial combustion chamber formed between the arcuate aft face of the channel plate and a combination of a front face wall of the baseplate and an outer wall of the nozzle insert; and
    a top plate connected to each of the air spacer ring, the air distribution ring and the channel plate at the aft end of the RDC, the top plate defining an opposing second side of the RDC;
    wherein the channel plate is further positioned between the base plate and the top plate, the channel plate having a channel plate central aperture formed therethrough and wherein the aft face of the channel plate diverges away from the base plate from the outer perimeter to the channel plate central aperture;
    a combustor inlet defined proximate an outer perimeter of the base plate and a combustor outlet defined radially inward of the combustor inlet proximate the channel plate central aperture;
    and
    wherein a cross sectional area of the combustion chamber is substantially constant in a radial direction from the combustor inlet to the combustor outlet.

2. The RDC of claim 1, wherein the air inlet spacer ring is circular.

3. The RDC of claim 1, wherein the nozzle insert selected from a group of differently sized nozzle inserts.

4. The RDC of claim 1, further comprising a variable nozzle area defined by a size of a selected nozzle insert.

5. The RDC of claim 1, wherein the radial combustor includes a constant annulus area as it progresses radially inward.

6. The RDC of claim 1, wherein the first, second and third fuel passageways form a plurality of combined colinear passageways from a fuel inlet at the first side of the RDC that extends in an axial direction toward the second side of the RDC and terminates at the radial combustion chamber.

7. The RDC of claim 1, wherein the fuel is stored in one of a gaseous form or a liquid form prior to combustion.

8. The RDC of claim 1, further comprising an exhaust nozzle formed downstream of the combustion chamber between the nozzle insert and the channel plate, wherein the exhaust nozzle transitions combustion gasses from a radially inward direction to an axial direction.

9. The RDC of claim 1, wherein the fuel ring is selected as one of a plurality of different fuel rings defined by variation in size and number of fuel injection nozzles.

* * * * *